United States Patent
Kim et al.

(10) Patent No.: US 10,739,896 B2
(45) Date of Patent: Aug. 11, 2020

(54) METHOD OF INPUTTING USER COMMAND AND ELECTRONIC APPARATUS USING THE SAME

(75) Inventors: Hyun-jin Kim, Gwangju (KR); Ji-yeon Kwak, Seoul (KR); Yong-gook Park, Yongin-si (KR); Min-kyu Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1224 days.

(21) Appl. No.: 12/483,337

(22) Filed: Jun. 12, 2009

(65) Prior Publication Data
US 2010/0017710 A1    Jan. 21, 2010

(30) Foreign Application Priority Data

Jul. 21, 2008 (KR) .................................. 2008-70842

(51) Int. Cl.
| | | |
|---|---|---|
| *G06F 3/041* | (2006.01) | |
| *G06F 3/0488* | (2013.01) | |
| *G06F 3/0481* | (2013.01) | |
| *G06F 3/0482* | (2013.01) | |
| *G06F 3/0484* | (2013.01) | |
| *G06F 3/0485* | (2013.01) | |

(52) U.S. Cl.
CPC .......... *G06F 3/0414* (2013.01); *G06F 3/0412* (2013.01); *G06F 3/0416* (2013.01); *G06F 3/0482* (2013.01); *G06F 3/0485* (2013.01); *G06F 3/0488* (2013.01); *G06F 3/04817* (2013.01); *G06F 3/04842* (2013.01); *G06F 3/04845* (2013.01); *G06F 3/04883* (2013.01); *G06F 2203/04806* (2013.01); *G06F 2203/04808* (2013.01)

(58) Field of Classification Search
CPC .... G06F 3/04883; G06F 3/017; G06F 3/0488; G06F 3/0414
USPC .................................................. 715/702, 863
See application file for complete search history.

(56) References Cited

U.S. PATENT DOCUMENTS 5,745,116 A * 4/1998 Pisutha-Arnond ..........................
G06F 3/04883
715/821
6,625,099 B2    9/2003 Nakano
2001/0005344 A1    6/2001 Nakano
(Continued)

FOREIGN PATENT DOCUMENTS

| EP | 1882902 A1 * | 1/2008 | ........... G06F 3/0414 |
|---|---|---|---|
| JP | 06-324794 | 11/1994 | |

(Continued)

OTHER PUBLICATIONS

Wikipedia, "Tablet personal computer," Jun. 2008.*
(Continued)

*Primary Examiner* — Sherrod L Keaton
(74) *Attorney, Agent, or Firm* — Jefferson IP Law, LLP

(57) ABSTRACT

A method of inputting user commands, and an electronic apparatus using the same. A method of inputting user commands includes setting a function of an apparatus implemented with a touch screen based on a pressure level input to the apparatus, and if the touch is sensed after setting the function of the apparatus, executing the set function based on the touch. Accordingly, user commands can be input using touch and pressure.

40 Claims, 14 Drawing Sheets

(56) References Cited

U.S. PATENT DOCUMENTS

| | | | |
|---|---|---|---|
| 2003/0048472 A1* | 3/2003 | Perdu | G03G 15/5075 358/1.15 |
| 2003/0063073 A1* | 4/2003 | Geaghan | G06F 3/0416 345/173 |
| 2003/0210235 A1 | 11/2003 | Roberts | |
| 2004/0246240 A1* | 12/2004 | Kolmykov-Zotov et al. | 345/179 |
| 2005/0193351 A1* | 9/2005 | Huoviala | G06F 3/0482 715/815 |
| 2006/0026521 A1 | 2/2006 | Hotelling et al. | |
| 2006/0026535 A1 | 2/2006 | Hotelling et al. | |
| 2006/0097991 A1* | 5/2006 | Hotelling et al. | 345/173 |
| 2006/0132456 A1* | 6/2006 | Anson | G06F 3/0488 345/173 |
| 2006/0250355 A1* | 11/2006 | Miller-Smith | G06F 3/0482 345/156 |
| 2007/0129046 A1* | 6/2007 | Soh | H04M 1/23 455/403 |
| 2007/0177803 A1* | 8/2007 | Elias et al. | 382/188 |
| 2007/0222768 A1* | 9/2007 | Geurts | G06F 3/0481 345/173 |
| 2007/0291009 A1* | 12/2007 | Wright | G06F 3/044 345/173 |
| 2008/0074399 A1* | 3/2008 | Lee | G06F 3/0482 345/173 |
| 2008/0184158 A1* | 7/2008 | Selig | G06F 40/174 715/781 |
| 2009/0046110 A1* | 2/2009 | Sadler | G06F 3/048 345/660 |

FOREIGN PATENT DOCUMENTS

| | | |
|---|---|---|
| JP | 11-355617 | 12/1999 |
| JP | 2003-058316 | 2/2003 |

OTHER PUBLICATIONS

Internet4Classrooms, "Entry-Level Computer Skills," Jan. 2007.*
Motion Computing, "Motion Tablet PC Quick Start Guide," Mar. 2006.*
Wikipedia, "Early tablet computers," Dec. 31, 2006, http://en.wikipedia.org/w/index.php?title=Early_tablet_computers&oldid=97625599, p. 9.*
International Search Report and Written Opinion dated Sep. 22, 2009 in PCT/KR2009/000600.
Office Action issued in Korean Application No. 10-2008-0070842 dated May 30, 2014.

* cited by examiner

METHOD OF INPUTTING USER COMMAND AND ELECTRONIC APPARATUS USING THE SAME

CROSS-REFERENCE TO RELATED APPLICATIONS

This application claims priority under 35 U.S.C. § 119 (a) from Korean Patent Application No. 10-2008-0070842, filed on Jul. 21, 2008, in the Korean Intellectual Property Office, the disclosure of which is incorporated herein by reference in its entirety.

BACKGROUND OF THE INVENTION

1. Field of the Invention

The present general inventive concept relates to a method of inputting user commands, and an electronic apparatus using the same. More particularly, the present general inventive concept relates to a method of inputting user commands using pressure and touch, and an electronic apparatus using the same.

2. Description of the Related Art

In general, electronic apparatuses such as MP3 players read out images or audio from a storage unit such as a flash memory or a hard disk drive (HDD) of a small size, decode them, and play them back.

When performing an operation in response to a user command, such an electronic apparatus displays a current operating state using a display panel such as a liquid crystal display (LCD), so a user can easily check the current operating state.

Recently, a method of inputting user commands has been developing so as to improve convenience and portability of electronic apparatuses. If diverse buttons are added to input diverse user commands, the volume of the electronic device increases, thereby reducing portability and adversely affecting the design. Accordingly, methods for inputting user commands are shifting to a display panel such as a touch screen, in which user commands are input by touch.

Touch screens capable of inputting user commands by pressure as well as by touch have been developed. However, when inputting a user command using such a pressure touch sensor, a user must maintain pressure of a constant intensity. In particular, when additionally inputting another user command by touch after inputting the user command by pressure of a constant intensity, errors in pressure intensity may occur according to the angle of motion of a finger of the user, and furthermore fatigue on the finger increases.

SUMMARY OF THE INVENTION

The present general inventive concept relates to a method of inputting user commands according to pressure level, and inputting user commands by touch if a predetermined condition is satisfied, and an electronic apparatus using the same.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of inputting user commands, the method including setting a function of an apparatus including a touch screen based on a pressure level input to the apparatus, and if a touch is sensed after setting the function of the apparatus, executing the set function based on the touch.

In the operation of executing the set function, if the touch is sensed after the input pressure level changes to be lower than a first pressure level, the set function may be executed.

The first pressure level may be lower than the pressure level to set the function of the apparatus.

The input pressure level may change to be lower than the first pressure level within a predetermined period of time.

In the operation of setting the function of the apparatus, if the input pressure level is within a predetermined pressure level range for a predetermined period of time, the function of the apparatus may be set based on the input pressure level.

The method may further include, if the touch is finished, finishing execution of the set function.

If the input pressure level is higher than a second pressure level, execution of the function of the apparatus may be cancelled.

The method may further include sensing the touch, and if the touch is sensed, setting the apparatus to a touch mode or a pressure mode by comparing the input pressure level with a specific pressure level, wherein the operation of setting the function of the apparatus is performed when the apparatus is in the pressure mode.

The operation of executing the function of the apparatus may be performed when the apparatus changes from the pressure mode to the touch mode.

The touch may be a touch trace.

The foregoing and/or other features and utilities of the present general inventive concept may be achieved by providing a method of inputting user commands, the method including setting a function of an apparatus implemented with a touch screen based on a pressure level input to the apparatus, and if the input pressure level changes to be lower than a first pressure level, executing the set function based on a duration of the input pressure level.

The input pressure level may change to be lower than the first pressure level within a predetermined period of time.

The foregoing and/or other features and utilities of the present general inventive concept may be achieved by providing an apparatus including an input unit including a touch screen to receive touch input and pressure input, and a control unit to set a function of the apparatus based on a pressure level of a touch input to the input unit, and to control the apparatus to execute the set function based on a touch trace input to the input unit.

The control unit may control the apparatus to execute the set function if the input pressure level changes to be lower than a first pressure level and the touch trace is formed.

The first pressure level may be lower than the pressure level to set the function of the apparatus.

The input pressure level may change to be lower than the first pressure level within a predetermined period of time.

The control unit may set the function of the apparatus based on the input pressure level if the input pressure level is within a predetermined pressure level range for a predetermined period of time.

The control unit may control the apparatus to finish execution of the function of the apparatus if the touch is finished.

The control unit may control the apparatus to cancel execution of the function of the apparatus if the input pressure level is higher than a second pressure level.

If the touch is input to the input unit, the control unit may set the apparatus to a touch mode or a pressure mode by comparing the input pressure level with a specific pressure level, and when the apparatus is in the pressure mode, the control unit may set the function of the apparatus.

The control unit may control the apparatus to execute the function of the apparatus based on the trace of the touch when the apparatus changes from the pressure mode to the touch mode.

The foregoing and/or other features and utilities of the present general inventive concept may be achieved by providing an apparatus including an input unit which includes a touch screen to receive touch input and pressure input, and a control unit to set a function of the apparatus based on a pressure level of a touch input to the input unit, and to execute the set function based on a duration of the touch if the input pressure level changes to be lower than a first pressure level.

The input pressure level may change to be lower than the first pressure level within a predetermined period of time.

The foregoing and/or other features and utilities of the present general inventive concept may be achieved by providing a method of inputting a command, the method including sensing a first pressure on a touch screen, determining whether the first pressure changes to a second pressure which is different than a threshold value for a predetermined period of time, and displaying a function according to the second pressure.

The method may further include determining whether the second pressure changes to a third pressure which is lower than a touch level, and executing the displayed function according to a touch which is higher than the touch level.

If the second pressure is higher than the threshold value, a next function may be displayed.

If the second pressure is lower than the threshold value, a previous function may be displayed.

The foregoing and/or other features and utilities of the present general inventive concept may be achieved by providing a method of inputting a command, the method including selecting a function according to a pressure level input on a touch screen, and executing the function according to a touch trace input on the touch screen.

The function selected may be a first function or a second function according to a first pressure level or a second pressure level, respectively.

The touch trace may be a touch formed continuously across a portion of the touch screen.

The foregoing and/or other features and utilities of the present general inventive concept may be achieved by providing a method of inputting a command, the method including displaying a sequence of menu items according to a pressure input on a touch screen, and selecting one of the menu items if the pressure is changed.

The method may further include executing a command related to the selected menu item according to a touch input on the touch screen.

The method may further include executing a command related to the selected menu item according to a touch trace input on the touch screen.

The touch trace may be a touch formed continuously across a portion of the touch screen.

The pressure may be input for a predetermined period of time.

BRIEF DESCRIPTION OF THE DRAWINGS

These and/or other features and utilities of the present general inventive will become apparent and more readily appreciated from the following description of the embodiments, taken in conjunction with the accompanying drawings of which.

DETAILED DESCRIPTION OF THE PREFERRED EMBODIMENTS

Figure 1:
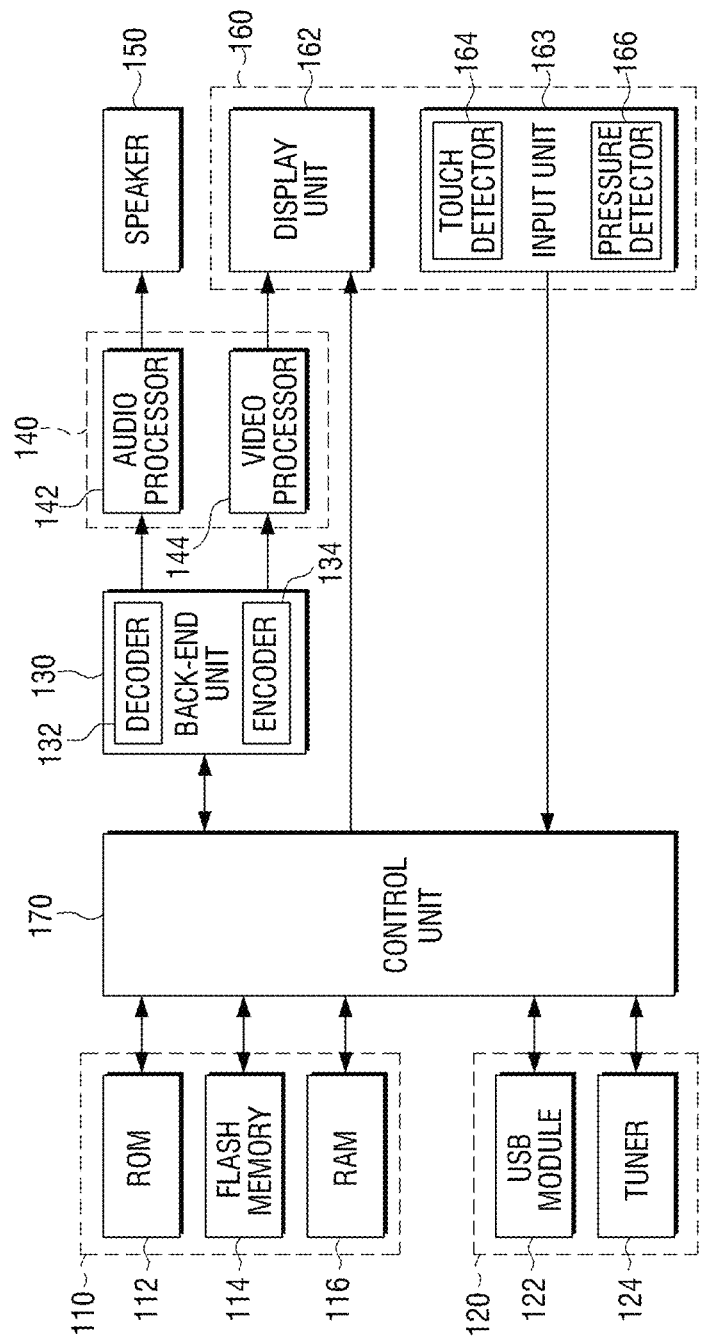
FIG. 1 is a schematic block diagram illustrating a configuration of an MP3 player, an electronic apparatus to which the present general inventive concept may be applied.

Reference will now be made in detail to the exemplary embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a schematic block diagram illustrating a configuration of an MP3 player, an electronic apparatus to which the present general inventive concept may be applied. For conciseness the present general inventive concept will be discussed with respect to an MP3 player, but this is not intended as a limitation to the present general inventive concept. It will be appreciated that the present general inventive concept can be applied in numerous contexts, including cellular telephones, smart phones, personal data assistants, laptop and palmtop computers, display monitors, still and video cameras, displays on scanners, copiers, printers and multifunction devices, and any other device which may permit commands to be input in accordance with the present general inventive concept. Referring to FIG. 1, the MP3 player may include a storage unit 110, a communication interface unit 120, a back-end unit 130, a signal processing unit 140, a speaker 150, a touch screen 160, and a control unit 170.

The storage unit 110 stores program information needed to control the MP3 player, content, menu information, and icon information, and may include a Read Only Memory (ROM) 112, a flash memory 114, and a Random Access Memory (RAM) 116.

The ROM 112 stores information which must be retained in storage even when power is turned off, for example, content on the MP3 player, content information, menu information, icon information, information on programs relative to icons, and information on diverse user commands which can be defined by the user.

The flash memory 114 stores programs to control the back-end unit 130 and diverse data for storage to be updated.

The RAM 116 temporarily stores diverse data as a backup, thereby functioning as a working memory of the control unit 170. Accordingly, data in the ROM 112 and the flash memory 114 remain even when power is turned off, whereas data in the RAM 116 are deleted when power is turned off.

The communication interface unit 120 performs data communication between an external device and the MP3 player, and may include a universal serial bus (USB) module 122 and a tuner 124. The USB module 122 transports data which are input to or output from a computer or a USB memory, which are USB devices. The tuner 124 receives radio or television broadcasts and transmits them to the back-end unit 130. Content related to the present general inventive concept may include broadcasts as well as still image files, moving image files, and audio files. The MP3 player may also include an appropriate component (not shown) to permit communication with a network, including a wireless network, and content may also include data received from such network or wireless network.

The back-end unit 130 is an element which processes compression, expansion, and playback of image or audio signals, and may include a decoder 132 and an encoder 134.

More specifically, the decoder 132 decompresses files output from the storage unit 110 or data output from the communication interface unit 120, and transmits audio to an audio processing unit 142 and images to the video processing unit 144. The encoder 134 compresses images and audio input through the communication interface unit 120 in a predetermined format, and transmits the compressed file to the storage unit 110.

The signal processing unit 140 converts an input signal into a signal in a format to be output, and may include an audio processor 142 and a video processor 144. The audio processor 142 converts a digital audio signal input from the back-end unit 130 into an analog audio signal, and outputs the analog audio signal to the speaker 150. The video processor 144 processes an image signal input from the back-end unit 130 and outputs the image signal to a display unit 162.

The touch screen 160 is a display element which provides functions for a display unit 162 to display images, text, or icons which are output from the video processor 144 or the control unit 170, and for an input unit 163 to receive user commands and transmit them to the control unit 170. Therefore, the user may see a menu on the touch screen 160 and may input user commands by touching, for example, a desired item on the touch screen 160.

The input unit 163 may include a touch detector 164 which detects a touch, and a pressure detector 166 which detects a pressure level. More specifically, the touch detector 164 forms a low energy field at a predetermined space on the touch screen 160, recognizes the change of energy when a conductive substance such as a finger enters the electric field, and transmits coordinates of the touched area on the touch screen 160 to the control unit 170. The pressure detector 166 detects pressure level input at the touched area, and transmits it to the control unit 170.

The pressure detector 166 may transmit a pressure level input at the touched area to the control unit 170, or may transmit a pressure level to the control unit 170 only when the input pressure level is out of a predetermined range. The touch detector 164 and the pressure detector 166 may be implemented as separate elements, or as a single element such as a pressure fusion touch sensor or other combined sensor of both touch and pressure.

The control unit 170 controls overall operation of the MP3 player. In particular, if a user command is input though the input unit 163, the control unit 170 controls function blocks corresponding to the user command. For example, if the user inputs a command to play back a file stored in the storage unit 110, the control unit 170 reads out the file from the storage unit 110, and transmits the file to the back-end unit 130. Subsequently, the control unit 170 controls function blocks so that the back-end unit 130 decodes the file, the audio processor 142 and the video processor 144 process audio and images, respectively, the speaker 150 outputs the audio, and the display unit 162 outputs the images.

If a user command is input by touch, the control unit 170 determines whether or not a pressure level received by the input unit 163 is higher than a touch level, which is a level at which touch can be sensed, and sets the MP3 player to be in a touch mode or a pressure mode. In addition, if the input pressure level changes to be lower than the touch level within a predetermined period of time, the control unit 170 changes the MP3 player from the pressure mode to the touch mode. In addition, if the input pressure level is maintained within a predetermined range for a predetermined period of time, the control unit 170 determines that the same function must be provided in the pressure mode.

For convenience of description, reference pressure levels are distinguished into a first pressure level (referred to hereinbelow as the touch level), a second pressure level, . . . , a pressure level K, . . . , and a pressure level N. If the pressure level is lower than the touch level, the control unit 170 sets the MP3 player to the touch mode. If the pressure level is higher than the touch level, the control unit 170 sets the MP3 player to the pressure mode.

If the input pressure level is higher than the pressure level K and lower than a pressure level K+1 (where K is higher than 2) for a predetermined period of time, the control unit 170 sets the pressure mode to provide a function K. When the function K is provided, the pressure level K is defined as a lower threshold value, and the pressure level K+1 is defined as a higher threshold value. If the function K is defined as a current function, functions equal to or lower than the a function K−1 are defined as previous functions, and functions equal to or higher than the function K+1 are defined as next functions.

If the user finishes a touch on the MP3 player in the touch mode, the control unit 170 may determine that it is a user command to finish execution of a function. If the pressure level in the touch mode is higher than a predetermined level within a predetermined period of time, the control unit 170 may determine that it is a user command to cancel execution of a function.

Figure 2:
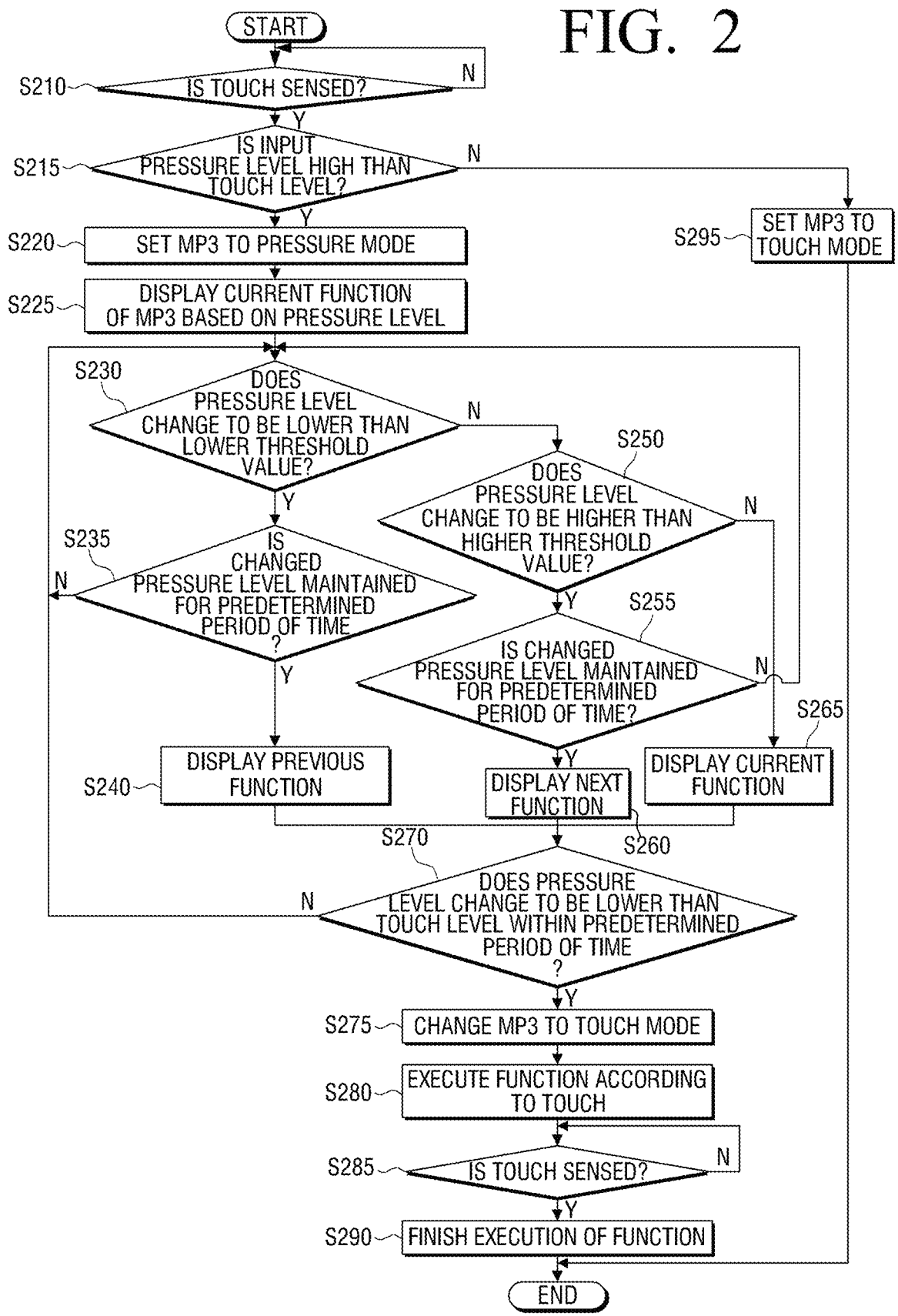
FIG. 2 is a flowchart illustrating a method of displaying and executing a function of an apparatus in a pressure mode or in a touch mode according to an exemplary embodiment of the present general inventive concept.

FIG. 2 is a flowchart illustrating a method of displaying and executing a function of an apparatus in a pressure mode or in a touch mode according to an exemplary embodiment of the present general inventive concept.

The control unit 170 determines if a touch is sensed (S210). More specifically, the user may view the touch screen 160 on which a menu is displayed using, for example, a user interface (UI), and may input a command to select a desired item by touching an area on the touch screen 160 displaying a desired item using a finger. Subsequently, the touch detector 164 in the input unit 163 detects the touch, and transmits coordinates of the touched area and the touch signal to the control unit 170, and the pressure detector 166 detects the pressure level of the touched area, and transmits the detected pressure level to the control unit 170. Accordingly, the control unit 170 can determine that a touch is sensed on the touch screen 160.

If the touch is sensed (S210-Y), the control unit 170 can determine if the input pressure level is higher than the touch level (S215). The touch level may be pre-stored by the manufacturer of the MP3 player, or set by the user.

If the input pressure level is higher than the touch level (S215-Y), the control unit 170 sets the MP3 player to the pressure mode (S220). If the input pressure level is lower than the touch level (S215-N), the control unit 170 sets the MP3 player to the touch mode (S295).

Subsequent to S220, the control unit 170 determines the function of the MP3 player based on the pressure level, and controls the display unit 162 to display the determined function (S225). For the following discussion, it is assumed that the MP3 player is set to the pressure mode when the user touches the touch screen 160, and that a function of the MP3 player determined according to the pressure level is a current function. For convenience of description, it is also assumed that an input pressure level is higher than the pressure level K and lower than the pressure level K+1.

The control unit 170 determines if the input pressure level changes to be lower than the lower threshold value (S230). If the user wishes to execute a function different from the current function displayed on the display unit 162, the user can do it by changing the pressure level. Firstly, a case where the user changes the pressure level to be lower than the lower threshold value will be discussed.

If the pressure level changes to be lower than the lower threshold value, and the changed pressure level is maintained within a predetermined range for a predetermined period of time (S230-Y and S235-Y), the control unit 170 controls the display unit 162 to display a previous function (S240). If the pressure level changes to decrease but be still higher than the pressure level K of the lower threshold value, the current function displayed on the display unit 162 does not change.

If the pressure level changes to be higher than the pressure level K−1 and lower than the pressure level K and is maintained for a predetermined period of time, the control unit 170 controls the display unit 162 to display a function K−1 (that is, a previous function). In addition, if the pressure level changes to be higher than the pressure level K−1 and lower than the pressure level K, but before a predetermined period of time has elapsed the changed pressure level changes to be higher than a pressure level K−1 and lower than the pressure level K−1, the control unit 170 does not control the display unit 162 to display the function K−1. However, if the pressure level changes to be higher than a pressure level K−3 and lower than the pressure level K−2 and is maintained for a predetermined period of time, the control unit 170 controls the display unit 162 to display a function K−3.

Alternatively, if the pressure level changes to be higher than the higher threshold value, and the changed pressure level is maintained within a predetermined range for a predetermined period of time (S250-Y and S255-Y), the control unit 170 controls function blocks to display a next (or subsequent) function on the display unit 162 (S260). Since displaying the next function by changing the pressure level follows the same process as displaying the previous function by changing the pressure level, the detailed description is not repeated here.

If the pressure level is maintained within a range corresponding to the displayed current function (S230-N and S250-N), the display unit 162 displays the current function (S265).

As described above, the user can select a desired function by changing the pressure level, thereby inputting user commands as desired. In addition, since functions change only when the pressure level changes and the changed pressure level is maintained within a predetermined range for a predetermined period of time, errors of user commands caused by pressure can be reduced.

While a certain function is being displayed, the control unit 170 may determine if the pressure level changes to be lower than the touch level within a predetermined period of time (operation S270). The user may select a desired function by changing the pressure level, and may change the pressure level to be lower than the touch level while touching so as to execute the selected function.

If the pressure level changes to be lower than the touch level within the predetermined period of time (operation S270-Y), the control unit 170 changes the MP3 to the touch mode (operation S275).

Subsequently, the control unit 170 executes a function according to the touch of the user (operation S280). If the user lifts the finger from the touch screen 160, the control unit 170 determines that touch is not sensed (operation S285-Y) and finishes execution of the function (S290).

As described above, in the pressure mode, if the pressure level changes to be lower than the touch level within the predetermined period of time, the MP3 player changes to the touch mode, so the set function can be executed. Accordingly, user commands can be more freely input on the touch screen 160.

In an exemplary embodiment of the present general inventive concept, when the MP3 player is in the pressure mode, if the pressure level changes to be lower than the touch level, a set function may be executed according to a touch trace, but the present general inventive concept is not limited thereto. That is, although the pressure level does not change to be lower than the touch level, if a touch trace is formed, a set function may be executed. In this case, if a touch trace is formed, a change of the pressure level does not matter.

Hereinbelow, a method of setting a function in the pressure mode, changing to the touch mode, and executing the set function is described in detail with reference to the drawings.

FIGS. 3 to 15 illustrate a method of selecting and executing a certain function when content is displayed according to an exemplary embodiment of the present general inventive concept.

Figure 3:
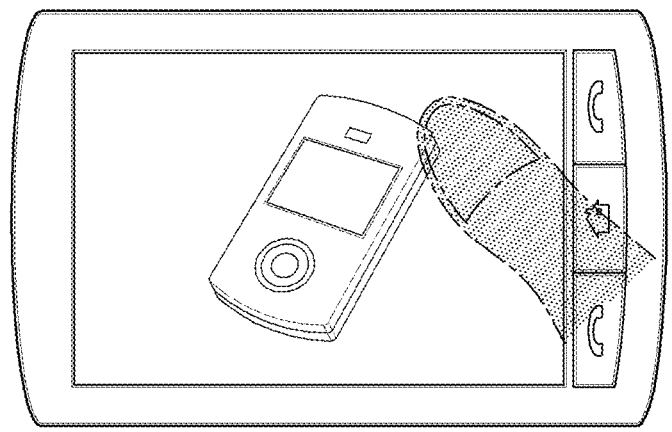
FIGS. 3 to 15 are drawings illustrating a method of selecting and executing a certain function when content is displayed according to an exemplary embodiment of the present general inventive concept.

Referring to FIG. 3, content is displayed on the touch screen 160. The user may touch a certain area on which the content is displayed, and may press the touched area to select a certain function related to the content.

Figure 4:
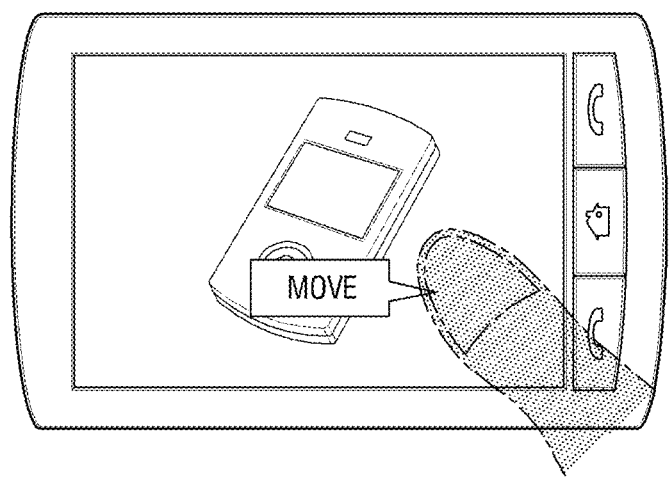
Figure 5:
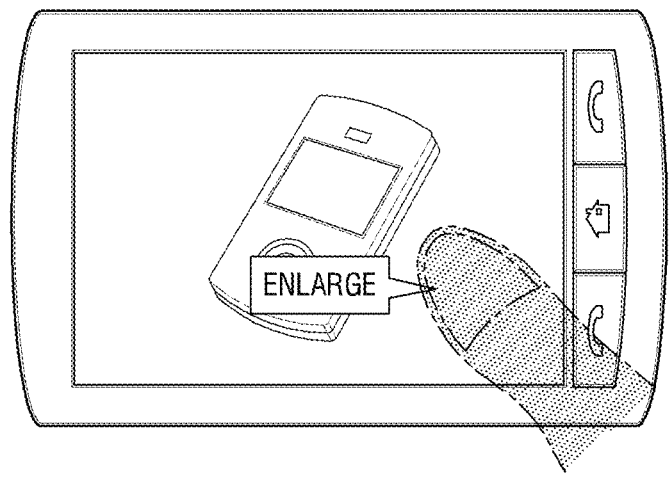
Figure 6:
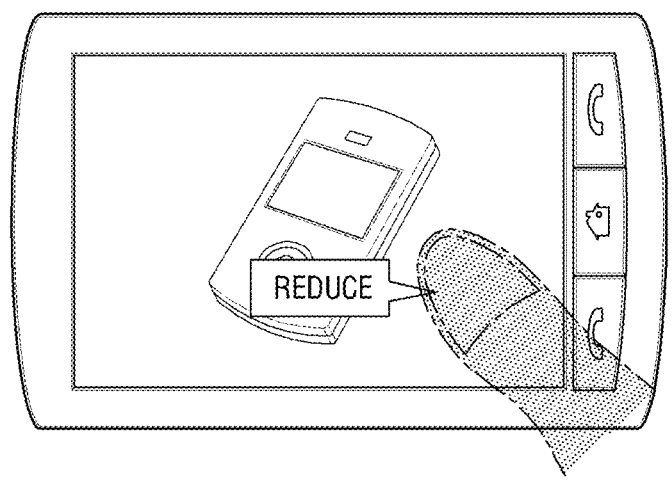

Pressure levels related to the content may include a first range (which is higher than the first pressure level (that is, the touch level) and lower than the second pressure level), a second range (which is higher than the second pressure level and lower than the third pressure level), and a third range (which is higher than the third pressure level and lower than the fourth pressure level). For example, the first range may be set to be a movement function, the second range may be set to be an enlargement function, and the third range may be set to be a reduction function. Accordingly, a user may select a function based on an input pressure level. For example, if the pressure level input by the user is within the first range, the movement function is displayed as illustrated in FIG. 4. If the pressure level input by the user is within the second range, the enlargement function is displayed as illustrated in FIG. 5. If the pressure level input by the user is within the third range, the reduction function is displayed as illustrated in FIG. 6.

By this process, the user can select a function of the MP3 player by changing the pressure level. However, when the pressure level increases or decreases, in order to distinguish a change to the touch mode from a cancellation of a function, a function may be displayed only when the pressure level is within a certain range for a predetermined period of time.

When a function to be executed is displayed on the display unit 162, the user may change the pressure level to be lower than the touch level. Accordingly, the MP3 is changed from the pressure mode to the touch mode, so a function may be executed according to a touch trace.

Figure 7:
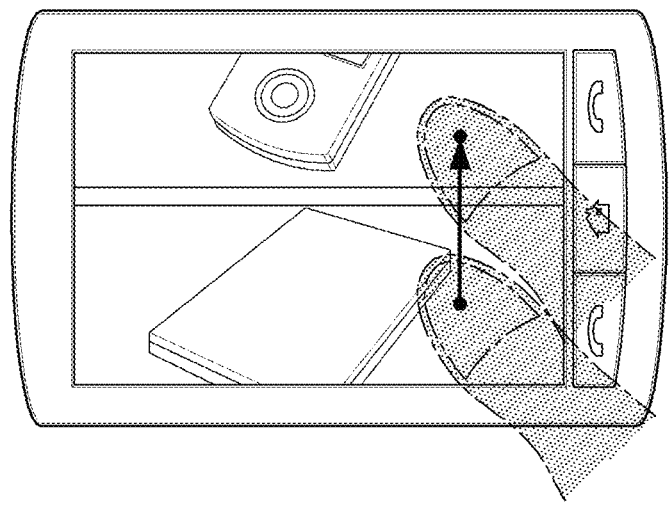

FIG. 7 illustrates a process of the user changing the pressure level to be lower than the touch level and forming the touch trace when the movement function is displayed as illustrated in FIG. 4. Referring to FIG. 7, if the user wishes to move the content upward, the user changes the pressure level to be lower than the touch level, and forms a touch trace upward. When changing the pressure level to be lower than the touch level, the user may change the pressure level within a predetermined period of time. As a result, the content moves upward as illustrated in FIG. 7.

Figure 8:
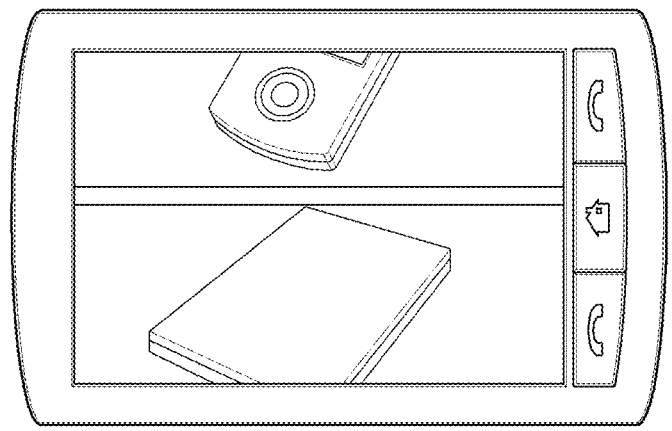
Figure 9:
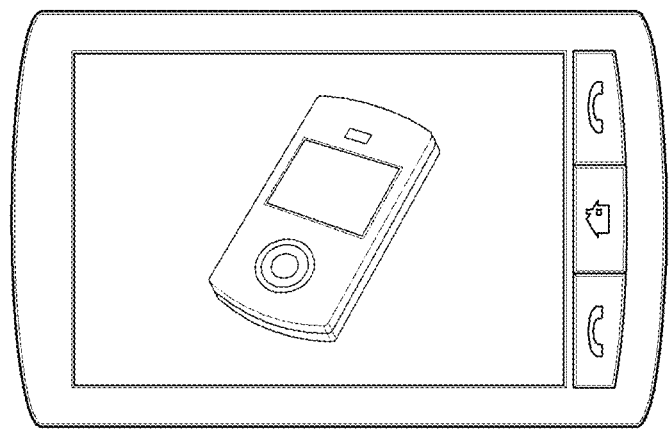

Subsequently, if the user wishes to finish the function and finishes the touch, execution of the function is finished as illustrated in FIG. 8. However, if the user wishes to cancel the movement function, the user may change the pressure level to be higher than a cancellation level (higher than the fourth pressure level in this exemplary embodiment) while touching the touch screen 160. Accordingly, a state may be changed (or returned) to a state from before the function was selected, and the same content as FIG. 3 may be displayed as illustrated in FIG. 9.

Figure 10:
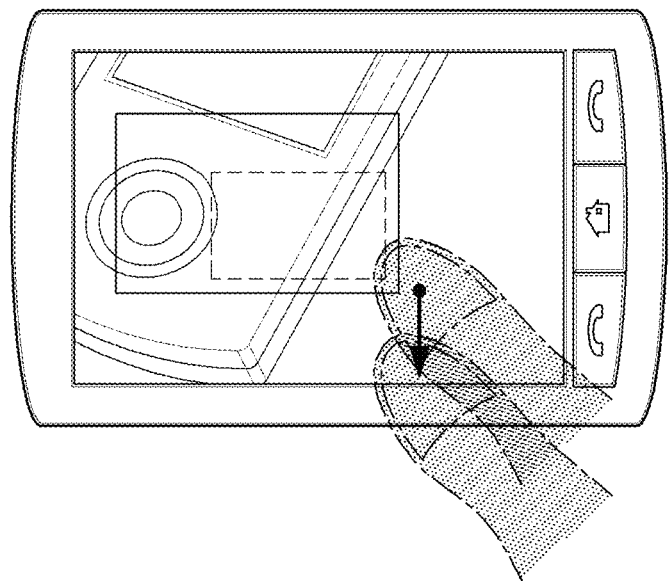
Figure 11:
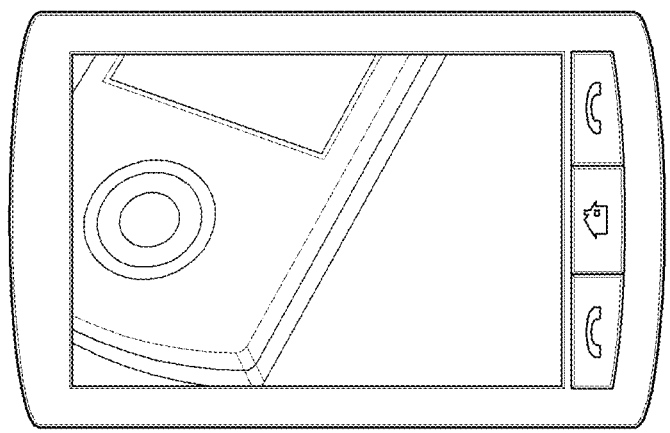
Figure 12:
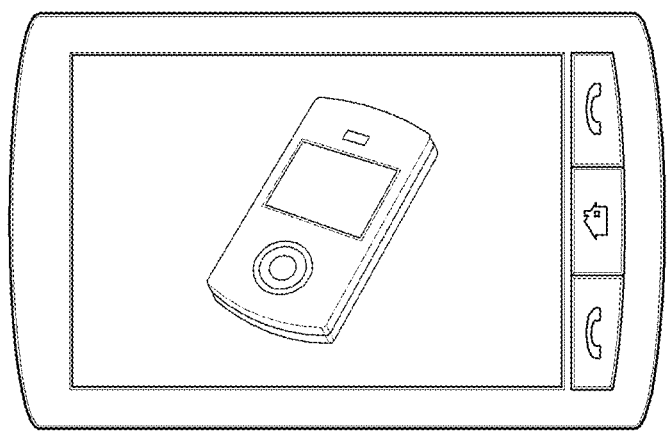

In the same manner, in order to execute an enlargement function, when the enlargement function is displayed as illustrated in FIG. 5, the user may change the pressure level to be lower than the touch level within a predetermined period of time, and may form the touch trace as much as the user wishes to enlarge the content. FIG. 10 illustrates the content enlarged according to the touch trace. In order to finish the enlargement function, if the user completes the touch, the finished function is displayed on the display unit 162 as illustrated in FIG. 11. In order to cancel the enlargement function, if the user changes the pressure level to be higher than the cancellation level, a screen from before the execution or selection of the enlargement function is displayed on the display unit 162 as illustrated in FIG. 12.

Figure 13:
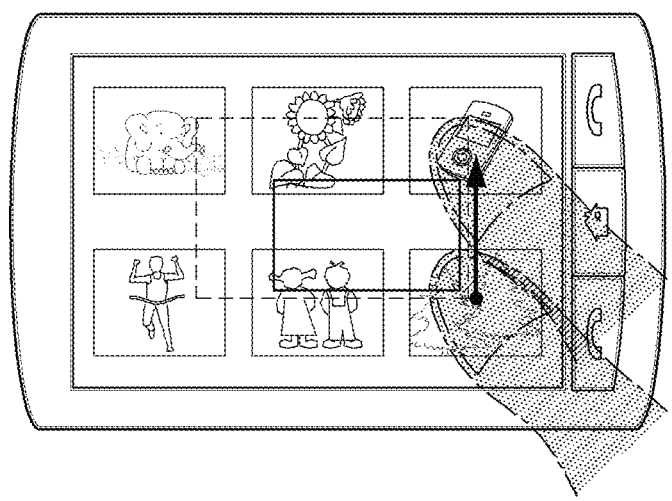
Figure 14:
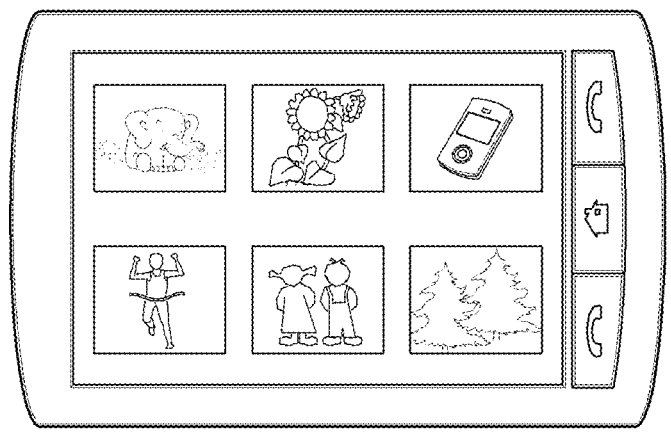
Figure 15:
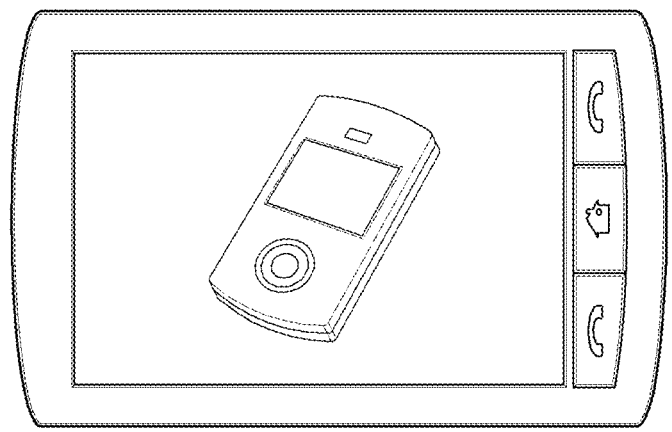

Furthermore, in order to execute the reduction function, when the reduction function is displayed as illustrated in FIG. 6, the user may change the pressure level to be lower than the touch level, and may form the touch trace as much as the user wishes to reduce the content. FIG. 13 illustrates the content reduced according to the touch trace. In FIG. 13, since the content is reduced, other content can also be displayed on the display unit 162. In order to finish the reduction function, if the user completes the touch, the finished function is displayed on the display unit 162 as illustrated in FIG. 14. In order to cancel the reduction function, if the user changes the pressure level to be higher than the cancellation level, a screen from before the execution or selection of the reduction function as illustrated in FIG. 15 is displayed on the display unit 162.

FIGS. 16 to 26 are drawings illustrating a method of selecting a sub menu when a menu is displayed according to another exemplary embodiment of the present general inventive concept.

Figure 16:
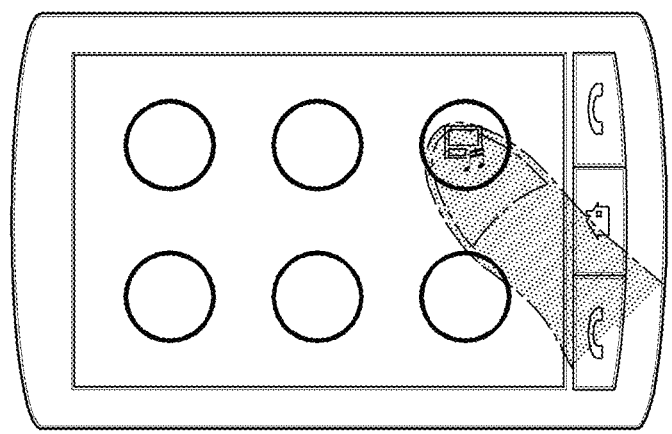
FIGS. 16 to 26 are drawings illustrating a method of selecting a sub menu when a menu is displayed according to another exemplary embodiment of the present general inventive concept.

Referring to FIG. 16, a menu including a list of items is displayed on the touch screen 160. The user may touch one of the plurality of items, and may apply pressure on the touched area in order to select a sub menu related to the selected item.

Figure 17:
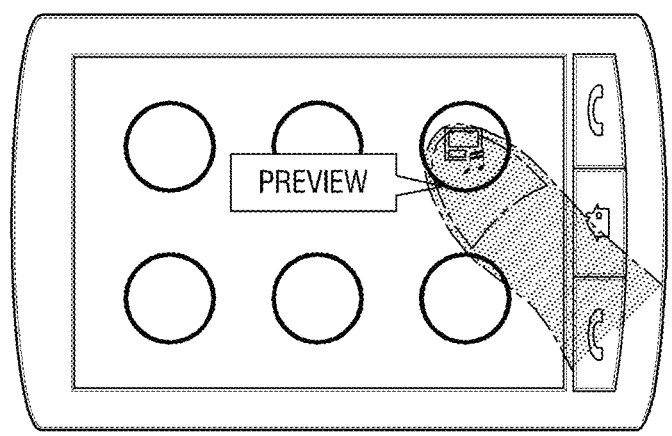
Figure 18:
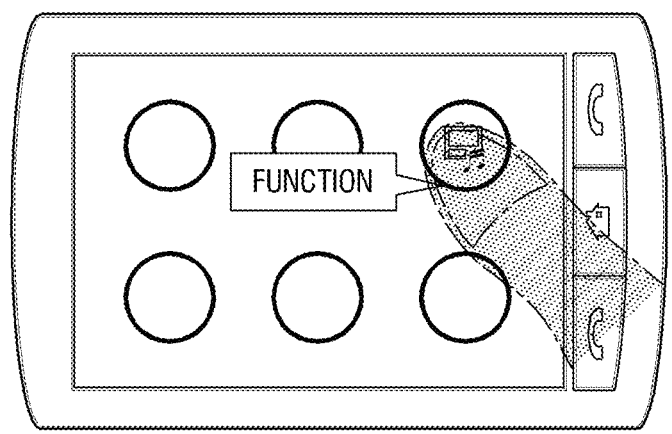
Figure 19:
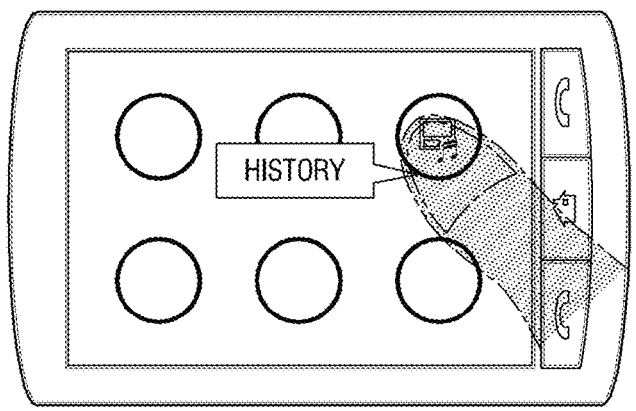

Sub menus related to the selected item may include a preview menu, a function menu, and a history menu as the pressure level increases. If the pressure level input by the user is within the first range, the preview menu is displayed as illustrated in FIG. 17. If the pressure level is within the second range, the function menu is displayed as illustrated in FIG. 18. If the pressure level is within the third range, the history menu is displayed as illustrated in FIG. 19.

When a sub menu to execute is displayed on the display unit 162, if the user changes the pressure level to be lower than the touch level, the MP3 changes from the pressure mode to the touch mode, and more specifically displays the sub menu according to touch.

Figure 20:
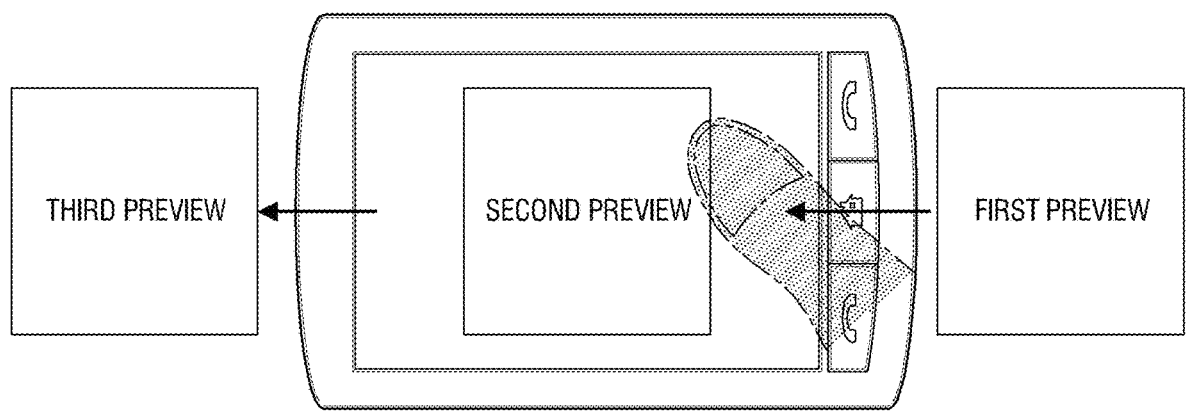
Figure 21:
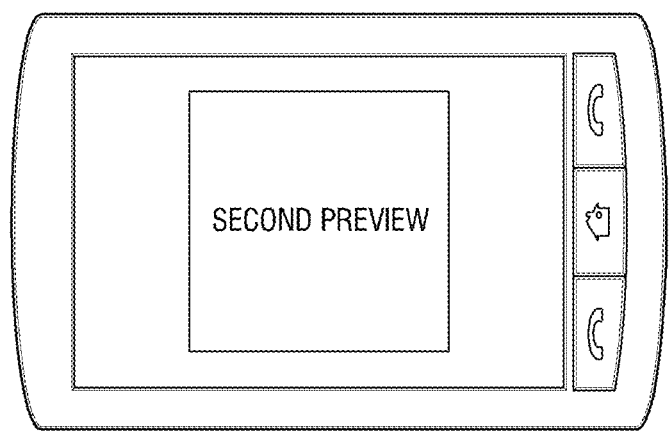
Figure 22:
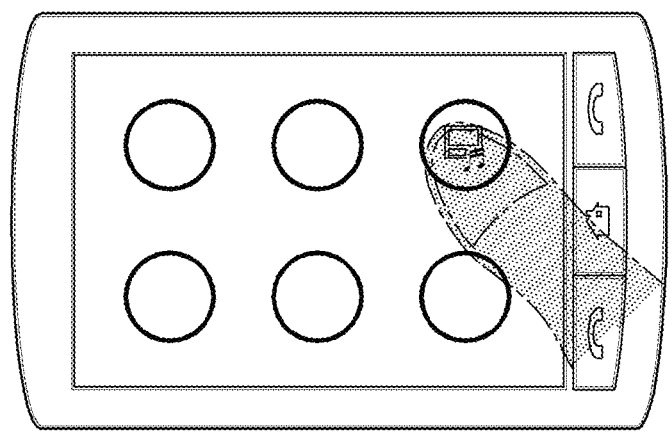

Referring to FIG. 17, when the preview menu is displayed, if the user changes the pressure level to be lower than the touch level and maintains a touch on touch screen 160, content related to the preview menu can be selected, executed and/or continuously displayed according to a duration of the touch. FIG. 20 illustrates a process of displaying content related to the preview menu according to a duration of the touch. If the user changes the pressure level from within the first range to be lower than the touch level and maintains the touch, the display unit 162 displays a first preview, a second preview, a third preview, and so on in sequence. In order to execute a specific preview, the user finishes the touch when the specific preview is displayed on the display unit 162. FIG. 21 illustrates the second preview executed by finishing the touch when the second preview is displayed on the display unit 162. In order to finish the preview menu, the user may change the pressure level to be higher than the cancellation level. Consequently, the same screen as FIG. 16, illustrating a state before the preview menu is selected, can be displayed on the display unit 162.

Figure 23:
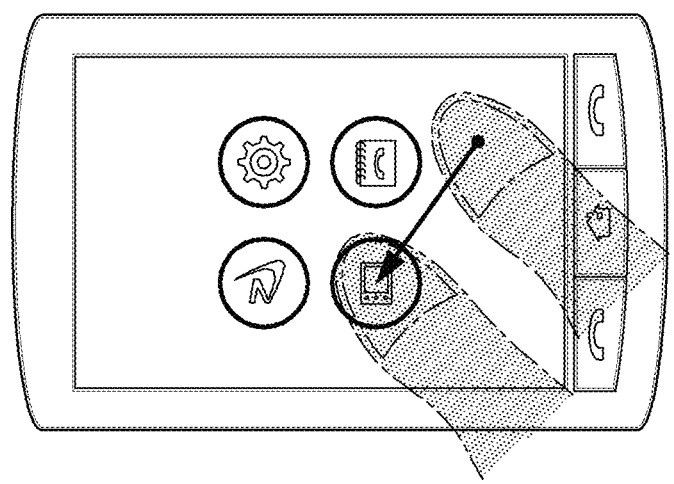
Figure 24:
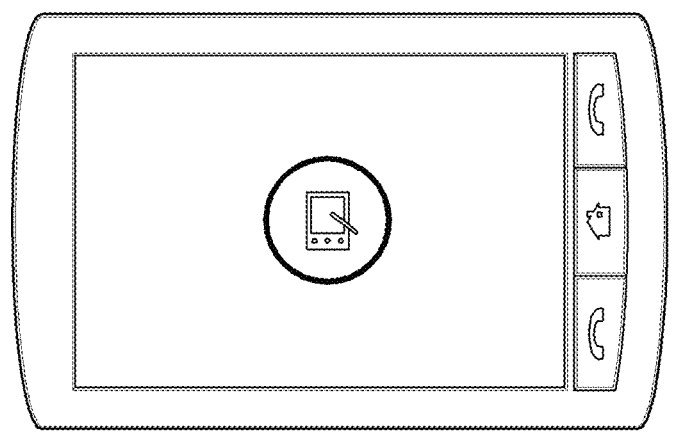
Figure 25:
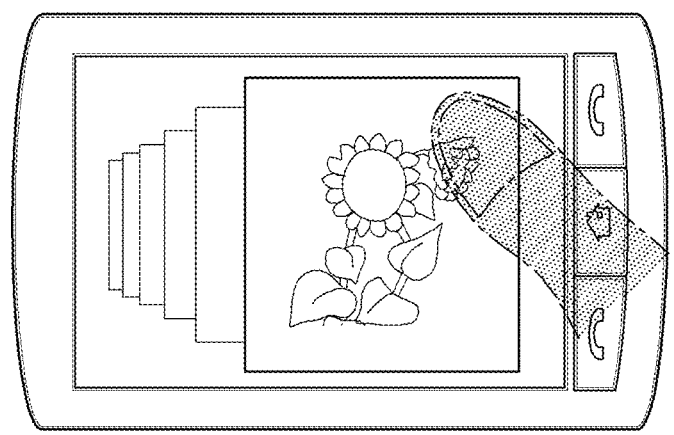
Figure 26:
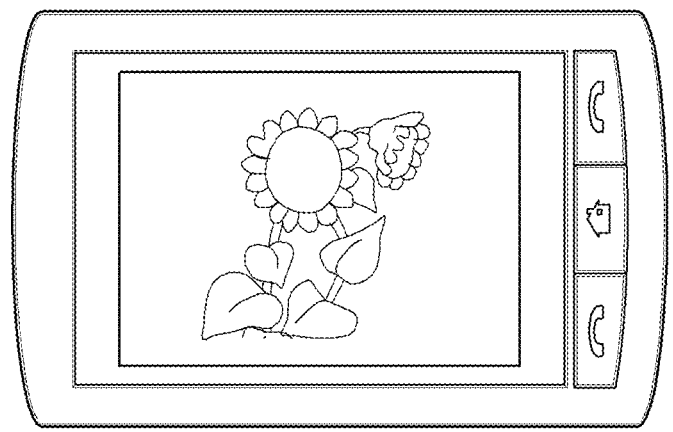

In the same manner, in order to execute the function menu, the user may change the pressure level to be lower than the touch level when, for example, "function" is displayed as illustrated in FIG. 18. Subsequently, a function menu may be displayed on the display unit 162 as illustrated in FIG. 23, and the user may touch an item to execute from among the function menu by forming a touch trace. After touching the item to execute, if the user finishes the touch, the selected item is executed. FIG. 24 illustrates the state that the selected item is being displayed on the display unit 162 when the selected item is executed. In order to cancel the function menu, the user changes the pressure level to be higher than the cancellation level.

Furthermore, in order to execute the history menu, the user can change the pressure level to be lower than the touch level when "history" is being displayed as illustrated in FIG. 19. Subsequently, if the user maintains a touch, the MP3 may sequentially display thumbnails for images which are previously stored for a duration of the touch. In order to display only a specific thumbnail, the user finishes touch when the specific thumbnail is displayed on the display unit 162.

As described above, when a function consists of a plurality of items, the touch mode may be used to execute the function and select one of the plurality of items. Accordingly, the touch mode and the pressure mode can be applied in diverse manners according to the function of the MP3 player.

The present general inventive concept is not only limited to MP3 players, but also may be applied to any electronic apparatuses which are implemented with touch screens.

As can be appreciated from the above description of the present general inventive concept, user commands can be input using touch and pressure.

When inputting a user command using pressure, since the user command is recognized as the same user command until a predetermined condition is satisfied, errors caused when inputting user commands can be reduced. In addition, when a user command is input using pressure and directly input using touch, since a predetermined condition is satisfied, the user can freely input user commands using touch and pressure.

Although various exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A method of inputting user commands in an apparatus, the method comprising:
    displaying, on a touch screen of the apparatus, a plurality of objects;
    detecting a first touch on one of the plurality of objects with a first pressure level;
    when the first pressure level is within a first range, displaying, on the touch screen of the apparatus, a first menu associated with the touched object while the touched object is displayed, the first menu comprising a first element for executing a first function associated with the touched object; when the first pressure level is within a second range,
    displaying, on the touch screen of the apparatus, a second menu associated with the touched object, the second menu comprising a second element for executing a second function associated with the touched object and the second function being different from first function;
    detecting a second touch on the displayed menu with a second pressure level; and
    executing a displayed function in response to the second touch, wherein the executed displayed function is a preview function, the preview function providing a plurality of preview images in sequence while the second pressure level is maintained, and in response to the second touch ending when a first preview image of the plurality of preview images is displayed, maintaining a display of the first preview image, and
    wherein the second touch includes a touch trace, where the touch trace is a touch formed continuously across a portion of the touch screen.

2. The method according to claim 1, wherein in an operation of executing the function, if the second touch is sensed after the pressure level of the first touch changes from higher than to lower than a first pressure level, the function is executed.

3. The method according to claim 2, wherein when the change of the pressure level of the first touch increases to greater than the first pressure level, from higher than to lower than the first pressure level the function of the apparatus is determined.

4. The method according to claim 2, wherein the pressure level of the first touch changes to be lower than the first pressure level within a predetermined period of time.

5. The method according to claim 1, wherein in an operation of determining the function of the apparatus, if the pressure level of the first touch is within a predetermined pressure level range for a predetermined period of time, a function corresponding to the predetermined pressure level range is determined as the function of the apparatus.

6. The method according to claim 1, further comprising:
    if the second touch is finished, finishing the execution of the function.

7. The method according to claim 1, further comprising:
    setting the apparatus to a touch mode or a pressure mode based on a comparison of the pressure level of the first touch and a predetermined pressure level,
    wherein an operation of determining the function of the apparatus is performed when the apparatus is in the pressure mode.

8. The method according to claim 7, wherein the operation of executing the function of the apparatus is performed when the apparatus changes from the pressure mode to the touch mode.

9. The method according to claim 1,
    wherein the displayed menu comprises a plurality of items corresponding to a plurality of functions, and
    wherein in an operation of executing the function, if the second touch on one of the plurality of items is detected, a function corresponding to the one of the plurality of items which is detected by the second touch, is executed.

10. The method according to claim 1, wherein the displayed menu comprises at least one of an item associated with the preview function and an item associated with a history function.

11. The method according to claim 1, wherein the touch screen comprises a touch detector which detects a touch, and a pressure detector which detects a pressure level.

12. The method according to claim 11, wherein the touch detector detects coordinates of a touched area and the pressure detector detects a pressure level of touch input at the touched area.

13. The method according to claim 1, wherein the first pressure level is higher than the second pressure level.

14. The method according to claim 1, wherein the menu is displayed if the first touch is detected on one of the plurality of objects during a predetermined period of time.

15. A method of inputting user commands, the method comprising:
    receiving a first touch at an apparatus implemented with a touch screen;
    determining a function of the apparatus based on a first pressure level of the first touch;
    displaying a first menu based on the determined function of the apparatus while a touched object is displayed, the first menu comprising a first element for executing a first function associated with the touched object;
    when the first pressure level is within a second range, displaying, on the touch screen of the apparatus, a second menu associated with the touched object, the second menu comprising a second element for executing a second function associated with the touched object and the second function being different from first function; and
    executing the determined function when a second touch with a second pressure level is detected on the first menu,
    wherein the determined function is a preview function, the preview function providing a plurality of preview images in sequence while the second pressure level is maintained, and in response to the second touch ending when a first preview image of the plurality of preview images is displayed, maintaining a display of the first preview image, and
    wherein the second touch includes a touch trace, where the touch trace is a touch formed continuously across a portion of the touch screen.

16. The method according to claim 15, wherein the pressure level of the touch changes from higher than to lower than the first pressure level within a predetermined period of time.

17. An apparatus, comprising:
a touch screen; and
a processor configured to:
control the touch screen to display a plurality of objects, control the touch screen to detect a first touch on one of the plurality of objects with a first pressure level, when the first pressure level is within a first range, control the touch screen to display a first menu associated with the touched object while the touched object is displayed, the first menu comprising a first element for executing a first function associated with the touched object;
when the first pressure level is within a second range, displaying, on the touch screen of the apparatus, a second menu associated with the touched object, the second menu comprising a second element for executing a second function associated with the touched object and the second function being different from first function;
control the touch screen to detect a second touch on the displayed menu with a second pressure level; and
executing a displayed function in response to the second touch,
wherein the displayed function is a preview function, the preview function providing a plurality of preview images in sequence while the second pressure level is maintained, and in response to the second touch ending when a first preview image of the plurality of preview images is displayed, maintaining a display of the first preview image, and
wherein the second touch includes a touch trace, where the touch trace is a touch formed continuously across a portion of the touch screen.

18. The apparatus according to claim 17, wherein the processor is further configured to control the apparatus to execute the function based on the touch trace of a touch input and if the first pressure level of the touch input changes from higher than to lower than a first pressure level and the touch trace is formed, where the touch trace is a touch formed continuously across a portion of the touch screen.

19. The apparatus according to claim 18, wherein the first pressure level is lower than the pressure level to determine the function of the apparatus.

20. The apparatus according to claim 18, wherein the first pressure level of the touch input changes from higher than to lower than the first pressure level within a predetermined period of time.

21. The apparatus according to claim 17, wherein if the pressure level of a touch input is within a predetermined pressure level range for a predetermined period of time, the processor is further configured to determine the function of the apparatus as a function corresponding to the predetermined pressure level range.

22. The apparatus according to claim 17, wherein the processor is further configured to control the apparatus to finish execution of the function of the apparatus if a touch input is finished.

23. The apparatus according to claim 18, wherein the processor is further configured to control the apparatus to execute the function of the apparatus based on the touch trace when the apparatus changes from a pressure mode to a touch mode.

24. The apparatus according to claim 17,
wherein the displayed menu comprises a plurality of items corresponding to a plurality of functions, and
wherein in an operation of executing the function, if the second touch on the one of the plurality of items is detected, a function corresponding to the one of the plurality of items which is detected by the second touch, is executed.

25. The apparatus according to claim 17, wherein the displayed menu comprises at least one of an item associated with the preview function and an item associated with a history function.

26. The apparatus according to claim 17, wherein the touch screen comprises a touch detector which detects a touch, and a pressure detector which detects a pressure level.

27. The apparatus according to claim 26, wherein the touch detector detects coordinates of a touched area and the pressure detector detects a pressure level of touch input at the touched area.

28. The apparatus according to claim 17, wherein the first pressure level is higher than the second pressure level.

29. The apparatus according to claim 17, wherein the menu is displayed if the first touch is detected on one of the plurality of objects during a predetermined period of time.

30. An apparatus, comprising:
an input device including a touch screen to receive touch input and to detect a first pressure level of the touch input; and a processor configured to:
determine a function of the apparatus based on the first pressure level of the touch input,
control the touch screen to display a first menu based on the determined function of the apparatus while a touched object is displayed and when the first pressure level is in a first range, the first menu comprising a first element for executing a first function associated with the touched object,
when the first pressure level is within a second range, displaying, on the touch screen of the apparatus, a second menu associated with the touched object, the second menu comprising a second element for executing a second function associated with the touched object and the second function being different from first function; and
execute the determined function when a second touch with a second pressure level is detected on the first menu,
wherein the determined function is a preview function, the preview function providing a plurality of preview images in sequence while the second pressure level is maintained, and in response to the second touch ending when a first preview image of the plurality of preview images is displayed, maintaining a display of the first preview image, and
wherein the second touch includes a touch trace, where the touch trace is a touch formed continuously across a portion of the touch screen.

31. The apparatus according to claim 30, wherein the input pressure level changes from higher than to lower than the first pressure level within a predetermined period of time.

32. A method of inputting a command, the method comprising:
sensing a first pressure on a touch screen;
determining a function to perform when a first pressure level of the sensed first pressure is within a first range;
activating the function according to the sensed first pressure, when the sensed first pressure is maintained for a first predetermined time;

displaying a first menu based on the activated function, the first menu displayed while a touched object is displayed, the first menu comprising a first element for executing a first function associated with the touched object;

determining whether the sensed first pressure changes to a second pressure, and whether the second pressure is maintained for a second predetermined period of time, a second pressure level being within a second range;

when the first pressure level is within a second range, displaying, on the touch screen of an apparatus, a second menu associated with the touched object, the second menu comprising a second element for executing a second function associated with the touched object and the second function being different from first function; and executing a displayed function in response to a second touch having the second pressure level, wherein the executed displayed function is a preview function, the preview function providing a plurality of preview images in sequence while the second pressure level is maintained, and in response to the second touch ending when a first preview image of the plurality of preview images is displayed, maintaining a display of the first preview image, and wherein the second touch includes a touch trace, where the touch trace is a touch formed continuously across a portion of the touch screen.

33. The method of claim 32, further comprising:
after displaying the object according to the function corresponding to the second pressure, determining whether the second pressure changes to a third pressure that is lower than a touch level for a third predetermined period of time;

entering a touch mode when the second pressure changes to the third pressure for the third predetermined period of time; and when in the touch mode, executing the displayed function.

34. The method of claim 32, wherein the function corresponds to a range of pressure levels defined by a lower threshold and a higher threshold, and after displaying the object according to the function, determining whether the second pressure changes to a third pressure that is greater than the higher threshold and whether the third pressure is maintained for a third predetermined period of time; and displaying a subsequent function when the third pressure is maintained for the third predetermined period of time.

35. The method of claim 32, wherein the function corresponds to a range of pressure levels defined by a lower threshold and a higher threshold, and after displaying the function, determined whether the second pressure changes to a third pressure which is less than the lower threshold and whether the third pressure is maintained for a third predetermined period of time; and displaying a previous function when the third pressure is maintained for the third predetermined period of time.

36. A method of inputting a command, the method comprising:
receiving a touch input;
detecting a first pressure level of the touch input;
determining a touch mode or a pressure mode based on a comparison of the detected first pressure level of the touch input with a predetermined pressure level;

determining a function according to the detected first pressure level of the touch input when an apparatus is set to the pressure mode;

displaying a first menu based on the determined function, the first menu displayed while the touched object is displayed, the first menu comprising a first element for executing a first function associated with the touched object;

when the first pressure level is within a second range, displaying, on a touch screen of the apparatus, a second menu associated with a touched object, the second menu comprising a second element for executing a second function associated with the touched object and the second function being different from first function; and executing a displayed function in response to a second touch input having the second pressure level, wherein the executed displayed function is a preview function, the preview function providing a plurality of preview images in sequence while the second pressure level is maintained, and in response to the second touch ending when a first preview image of the plurality of preview images is displayed, maintaining a display of the first preview image, and wherein the second touch includes a touch trace, where the touch trace is a touch formed continuously across a portion of the touch screen.

37. The method of claim 36, wherein the function selected is a first function or a second function according to the first pressure level or a second pressure level, respectively.

38. A method of inputting a command, the method comprising:
sequentially displaying a plurality of menu items according to a varying pressure level of a touch input on a touch screen, each of the plurality of menu items associated with a function corresponding to a touched object, a menu item of the plurality of menu items displayed while a corresponding touched object is displayed, a first menu item comprising a first element for executing a first function associated with the touched object and a second menu item comprising a second element for executing a second function associated with the touched object and the second function being different from first function; and selecting one of the plurality of menu items if the pressure is released, wherein an execution screen corresponding to the selected one of the plurality of menu items is displayed in response to the selection, wherein the executed screen is a preview function, the preview function providing a plurality of preview images in sequence while a second pressure level is maintained, and in response to a second touch ending when a first preview image of the plurality of preview images is displayed, maintaining a display of the first preview image, and wherein the second touch maintains the second pressure level and includes a touch trace, where the touch trace is a touch formed continuously across a portion of the touch screen.

39. The method of claim 38, further comprising:
executing a command related to the selected menu item according to a touch input on the touch screen.

40. The method of claim 38, wherein the pressure is input for a predetermined period of time.

* * * * *